under 35 U.S.C. 154(b) by 0 days.

(12) United States Patent
Wells et al.

(10) Patent No.: US 7,686,854 B2
(45) Date of Patent: Mar. 30, 2010

(54) SILICONE SEAL FOR BIPOLAR PLATES IN A PEM FUEL CELL

(75) Inventors: Allan R Wells, Rochester, NY (US); Gary J. DeAngelis, Spencerport, NY (US); Arthur R. Williams, Spencerport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/877,656

(22) Filed: Jun. 25, 2004

(65) Prior Publication Data

US 2004/0231142 A1  Nov. 25, 2004

Related U.S. Application Data

(63) Continuation of application No. 10/305,612, filed on Nov. 27, 2002, now abandoned.

(51) Int. Cl.
*H01M 6/00* (2006.01)
(52) U.S. Cl. .................... 29/623.2; 29/623.4; 429/35
(58) Field of Classification Search .................. 429/36, 429/35, 38, 30, 34, 32.37, 39; 29/623.4, 29/623.2, 623.1, 730
See application file for complete search history.

(56) References Cited

U.S. PATENT DOCUMENTS 6,451,469 B1 * 9/2002 Nakamura et al. ............ 429/36

2001/0049044 A1* 12/2001 Molter ........................ 429/34
2002/0094464 A1   7/2002 Wangerow
2008/0070081 A1*  3/2008 Franklin et al. .............. 429/26

FOREIGN PATENT DOCUMENTS

EP   1073138    1/2001
WO   02093672   11/2002

OTHER PUBLICATIONS

EP Search Report dated Oct. 29, 2009.

* cited by examiner

*Primary Examiner*—Patrick Ryan
*Assistant Examiner*—Monique Wills
(74) *Attorney, Agent, or Firm*—Thomas N. Twomey

(57) ABSTRACT

Seal means for sealing a bipolar plate to a membrane in a PEM fuel cell stack. The seal includes a thin layer of a cross-linkable silicone composition disposed between the bipolar plate and the membrane. The layer is applied as a liquid to either the plate or the membrane and preferably is polymerized prior to assembly of the stack. A preferred means for applying the composition to the bipolar plate is screen printing. Preferably, the layer has a thickness between 0.001 and 0.005 inch. The resulting fuel cell stack exhibits superior leak resistance. In a currently preferred embodiment, a layer of the silicone composition is provided at interfaces between a membrane and both an anode side and a cathode side of a bipolar plate.

24 Claims, 2 Drawing Sheets

SILICONE SEAL FOR BIPOLAR PLATES IN A PEM FUEL CELL

CROSS REFERENCE TO RELATED APPLICATIONS

This application is a continuation of U.S. patent application Ser. No. 10/305,612, filed on Nov. 27, 2002 now abandoned.

TECHNICAL FIELD

The present invention relates to fuel cells incorporating a proton exchange membrane (PEM); more particularly, to means for preventing gas leakage between plate elements of a PEM fuel cell stack; and most particularly, to a silicone seal screen-printed on bipolar plate elements to prevent leakage between membrane electrode assembly elements and bipolar plates.

BACKGROUND OF THE INVENTION

Fuel cell assemblies employing proton exchange membranes are well known. Such assemblies typically comprise a stack of fuel cell modules, each module having an anode and a cathode separated by a catalytic proton exchange membrane (PEM), and the modules in the stack being connected in series electrically to provide a desired voltage output. Gaseous fuel, in the form of hydrogen or hydrogen-containing mixtures such as "reformed" hydrocarbons, flows adjacent to a first side of the membrane, and oxygen, typically in the form of air, flows adjacent to the opposite side of the membrane. Hydrogen is catalytically oxidized at the anode-membrane interface, and the resulting proton, H+, migrates through the membrane to the cathode-membrane interface where it combines with anionic oxygen, $O^{-2}$, to form water. Protons migrate only in those areas of the fuel cell in which the anode and cathode are directly opposed across the membrane. Electrons flow from the anode through an external circuit to the cathode, doing electrical work in a load in the circuit.

A fuel cell assembly typically comprises a plurality of fuel cell modules connected in series to form a fuel cell stack. For convenience in manufacture, and to provide a more rugged assembly, the anode for one cell and the cathode for an adjacent cell typically are formed as rigid plates and then bonded back-to-back, forming a "bipolar plate", as is well known in the art. A fuel cell assembly thus consists typically of a stack of alternating bipolar plates and proton exchange membranes. At the outer edges of the assembly, the plates and membranes are sealed together to contain the reactant gases and/or coolant within the assembly. Thus, an important aspect of forming a stacked fuel cell assembly is preventing leakage between the membranes and the plates.

One prior art approach has been to mold a liquid silicone rubber (LSR) gasket directly onto the bipolar plates using liquid injection molding techniques. This has proved to be difficult due to the complex shape of the seal and plate geometry, and also the very brittle nature of some composite materials typically used in forming the bipolar plates.

Another prior art approach has been to provide a die-cut or separately-molded gasket on one side of the plates, the membrane thus being sandwiched between the gasket and the adjacent bipolar plate. In some instances, an assembly may leak initially at the interface between the membrane and the non-gasketed plate surface, although the leak may self-seal when the membrane becomes hydrated in use. Initial leakage, however, is unacceptable.

Thus, sealing means on both sides of each bipolar plate is desirable because a membrane is thus sealed on both its sides against sealing material rather than against a bare bipolar plate.

It is a principal object of the present invention to economically and reliably seal a proton exchange membrane against a bipolar plate surface in a fuel cell stack, both initially and during extended operation of the stack.

SUMMARY OF THE INVENTION

Briefly described, a means for sealing a bipolar plate to a membrane in a PEM fuel cell stack includes a thin layer of a cross-linkable silicone composition between the bipolar plate and the membrane. The layer is applied as a low viscosity fluid to either the plate or the membrane and preferably is polymerized prior to assembly of the stack. A preferred means for applying the composition to the bipolar plate is screen printing. The resulting fuel cell assembly exhibits superior leak resistance. In a currently preferred embodiment, layers of the silicone composition are provided at both interfaces between a membrane and both an anode side and a cathode side of a bipolar plate.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
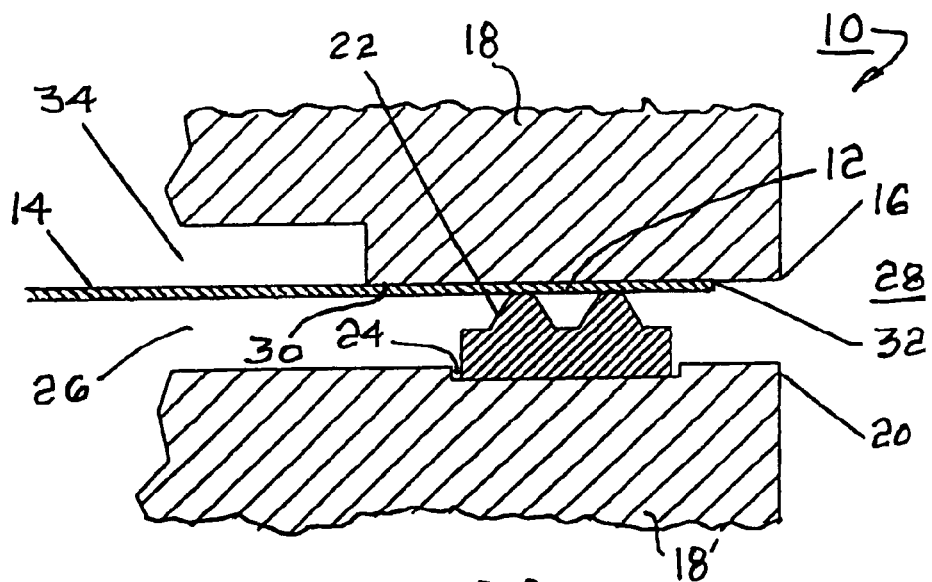
FIG. 1 is an elevational cross-sectional view of a portion of a prior art PEM fuel cell.

Referring to FIG. 1, in a typical prior art PEM fuel cell 10, a first edge portion 12 of a proton exchange membrane 14 extends between the cathode side 16 of a first bipolar plate assembly 18 and the anode side 20 of a typically identical second bipolar plate assembly 18'. An elastomeric gasket 22 is disposed on anode side 20, typically in a shallow groove 24, to seal against membrane 14 to prevent leakage of gas from first flow chamber 26 to the exterior 28 of the fuel cell. Membrane 14 itself forms an integral seal against first bipolar plate surface 30 of cathode side 16, which seal is known to permit leakage 32 of gas from second flow chamber 34 under some circumstances, especially at first usage of the fuel cell before the membrane becomes hydrated.

Figure 2:
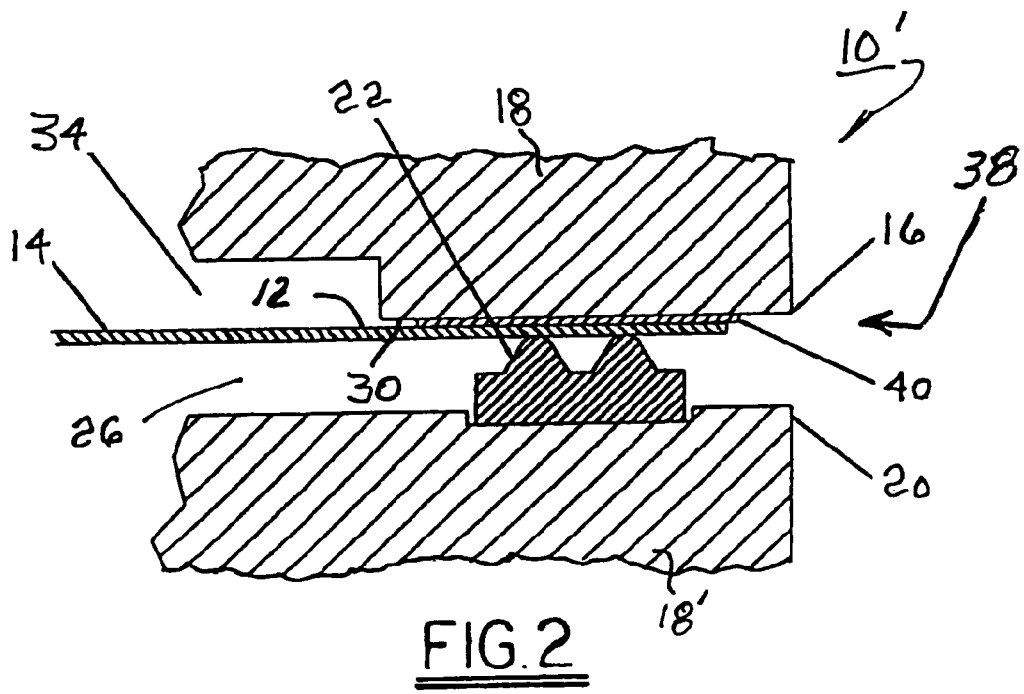
FIG. 2 is an elevational cross-sectional view of a portion of a PEM fuel cell in accordance with a first embodiment of the invention.

Referring to FIG. 2, a first embodiment 10' of a fuel cell in accordance with the invention includes all components shown in prior art fuel cell 10 in FIG. 1. Additionally however, membrane seal 38 includes a thin first seal element 40 is disposed along the first surface of an edge portion 12 of membrane 14 between membrane 14 and cathode side 16. First seal element 40 is preferably formed of a cross-linkable silicone composition, for example, an organopolysiloxane such as RTV, which is applied as a liquid layer to either first bipolar plate surface 30 or first surface of edge portion 12 of membrane 14, preferably to plate surface 30, and then cross-linked as by atmospheric moisture and/or incorporated activator to form a thin non-fluid elastomeric layer. The low viscosity fluid composition flows into microscopic pores and depressions in the surface to which it is applied, thereby sealing against later gas leakage therethrough. In compression during assembly of a fuel cell stack, the seal element readily deforms, without flowing, to accommodate similar non-uniformities in the opposing surface against which it is urged.

A typical RTV composition is Dow Corning 3140 thinned as required using Dow Corning OS-30 methylsiloxane fluid in proportions known in the art without undue experimentations.

A preferred method for applying a thin film of the composition is screen printing, by which means complex patterns of the seal are readily provided as may be needed to accommodate complex sealing surfaces of fuel cell elements. Screen printing is well known and need not be further elaborated here. Other methods of application, for example, roller application, are of course within the scope of the invention.

Seal element 40 is preferably relatively thin, on the order of 0.005 inch or less, and preferably between about 0.001 inch and about 0.003 inch, and is readily formed in a single printing pass.

Figure 3:
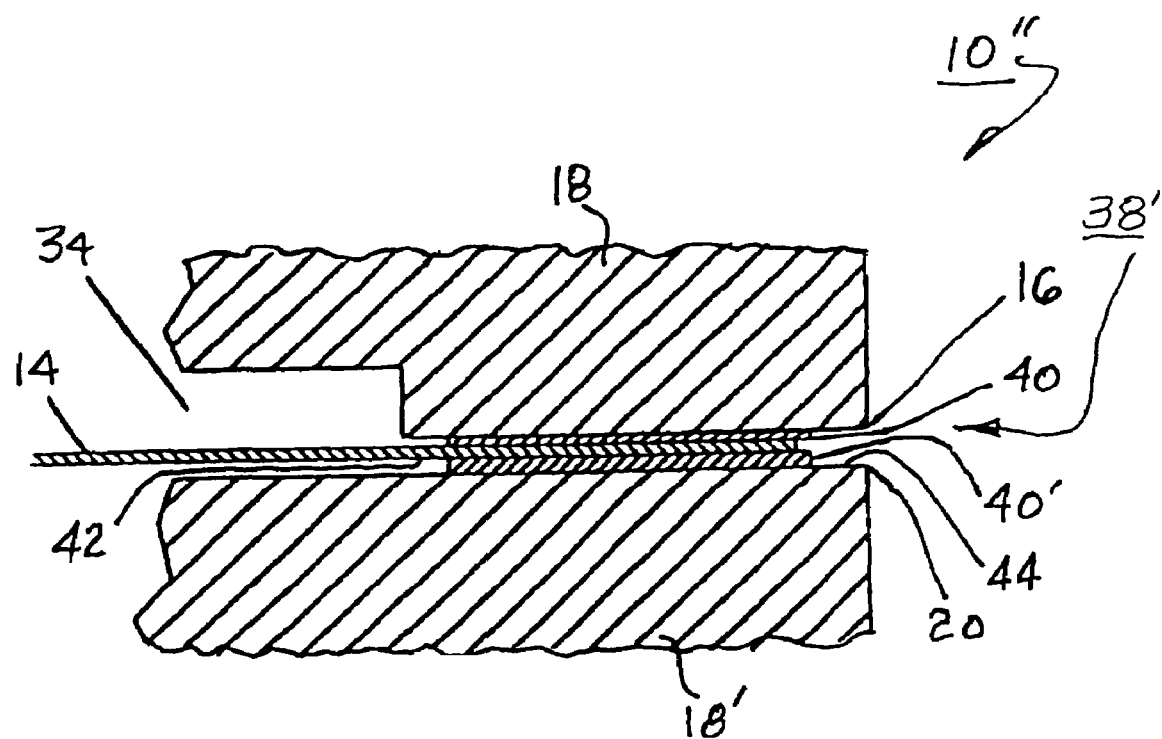
FIG. 3 is an elevational cross-sectional view of a portion of a PEM fuel cell in accordance with a second embodiment of the invention.

Referring to FIG. 3, in a currently preferred second embodiment 10", prior art gasket 22 and groove 24 (FIG. 1) are eliminated from membrane seal 38' and are replaced by a second seal element 40', which may be composed essentially identically with first seal element 40, and coated to either second surface 42 of the edge portion of membrane 14 or bipolar plate surface 44 of anode side 20, as described above.

Of course, fuel cells of either embodiments 10', 10" may be stacked together to form fuel cell stacks or assemblies, as known in the art.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for sealing first and second bipolar plates in a proton exchange membrane fuel cell module, said method comprising:
    applying a layer of a fluid composition elastomeric sealant in a single pass on one of a first surface of an edge portion of a membrane or a surface of the first bipolar plate to form a first seal element; and
    sealing the first bipolar plate and said membrane with only said first seal element, wherein said first seal element is positioned between the first bipolar plate and said first surface of the edge portion of said membrane so that gas leakage is prevented between said membrane and the first bipolar plate.

2. A method in accordance with claim 1 wherein said first seal element is applied on one of said first surface of the edge portion of said membrane or the surface of the first bipolar plate as a liquid layer.

3. A method in accordance with claim 2 wherein said first seal element is cross-linked after being applied as a liquid layer to form a non-fluid elastomeric layer.

4. A method in accordance with claim 3 wherein said first seal element is cross-linked by at least one of an incorporated activator or atmospheric moisture.

5. A method in accordance with claim 1 wherein said fluid composition flows into at least one of pores or depressions in the surface to which said fluid composition is applied.

6. A method in accordance with claim 1 further comprising:
    compressing the first bipolar plate and said membrane so that said first seal element deforms to accommodate non-uniformities in the opposing surface to which it is urged.

7. A method in accordance with claim 1 wherein a thickness of said first seal element is less than 30 μm.

8. A method in accordance with claim 1 wherein said first seal element is applied to one of said first surface of the edge portion of said membrane or the surface of the first bipolar plate by screen printing.

9. A method in accordance with claim 1 wherein said first seal element is formed of a cross-linkable silicon composition.

10. A method in accordance with claim 3 wherein first seal element is formed of an organopolysiloxane.

11. A method in accordance with claim 1 further comprising:
    associating a gasket with a surface of the second bipolar plate, said gasket molded separate from said membrane, the first bipolar plate and the second bipolar plate; and
    joining the first and second bipolar plates, wherein said gasket is positioned between the second bipolar plate and a second surface of the edge portion of said membrane so that gas leakage is prevented between said membrane and the second bipolar plate.

12. A method in accordance with claim 1 further comprising:
    applying a layer of a fluid composition elastomeric sealant in a single pass on one of a second surface of an edge portion of said membrane or a surface of the second bipolar plate to form a second seal element; and
    sealing the second bipolar plate and said membrane with only said second seal element, wherein said second seal element is positioned between the second bipolar plate and said second surface of the edge portion of said membrane so that gas leakage is prevented between said membrane and the second bipolar plate.

13. A method for sealing first and second bipolar plates in a proton exchange membrane fuel cell module, said method comprising:
    applying a layer of a liquid composition elastomeric sealant in a single pass on one of a first surface of an edge portion of a membrane or a surface of the first bipolar plate to form a first seal element;
    allowing said liquid composition forming said first seal element to flow into at least one of pores and depressions in the surface to which said liquid composition is applied;
    cross-linking said first seal element to form a non-fluid elastomeric layer;
    sealing the first bipolar plate and said membrane with only said first seal element, wherein said first seal element is positioned between the first bipolar plate and said first surface of the edge portion of said membrane so that gas leakage is prevented between said membrane and the first bipolar plate; and
    compressing the first bipolar plate and said membrane so that said first seal element deforms to accommodate non-uniformities in the opposing surface to which it is urged.

14. A method in accordance with claim 13 wherein said first seal element is cross-linked by at least one of atmospheric moisture or an incorporated activator.

15. A method in accordance with claim 13 wherein a thickness of said first seal element is less than 30 μm.

16. A method in accordance with claim 13 wherein said first seal element is applied to one of said first surface of the edge portion of said membrane or the surface of the first bipolar plate by screen printing.

17. A method in accordance with claim 13 wherein said first seal element is formed of a cross-linkable silicon composition.

18. A method in accordance with claim 13 further comprising:
associating a gasket with a surface of the second bipolar plate, said gasket molded separate from said membrane, the first bipolar plate and the second bipolar plate; and
joining the first and second bipolar plates, wherein said gasket is positioned between the second bipolar plate and a second surface of the edge portion of said membrane so that gas leakage is prevented between said membrane and the second bipolar plate.

19. A method in accordance with claim 13 further comprising:
applying a layer of a liquid composition elastomeric sealant in a single pass on one of a second surface of an edge portion of said membrane or a surface of the second bipolar plate to form a second seal element;
allowing said liquid composition forming said second seal element to flow into at least one of pores or depressions in the surface to which said liquid composition is applied;
cross-linking said second seal element to form a non-fluid elastomeric layer; and
sealing the second bipolar plate and said membrane with only said second seal element, wherein said second seal element is positioned between the second bipolar plate and said second surface of the edge portion of said membrane so that gas leakage is prevented between said membrane and the second bipolar plate.

20. A method in accordance with claim 19 further comprising:
compressing the second bipolar plate and said membrane so that said second seal element deforms to accommodate non-uniformities in the opposing surface to which it is urged.

21. A method for sealing first and second bipolar plates in a proton exchange membrane fuel cell module, said method comprising:
applying a layer of a fluid composition elastomeric sealant in a single pass on a first surface of an edge portion of a membrane to form a first seal element; and
sealing the first bipolar plate and said membrane with only said first seal element, wherein said first seal element is positioned between the first bipolar plate and said first surface of the edge portion of said membrane so that gas leakage is prevented between said membrane and the first bipolar plate.

22. A method in accordance with claim 21 further comprising:
associating a gasket with a surface of the second bipolar plate, said gasket molded separate from said membrane, the first bipolar plate and the second bipolar plate; and
joining the first and second bipolar plates, wherein said gasket is positioned between the second bipolar plate and a second surface of the edge portion of said membrane so that gas leakage is prevented between said membrane and the second bipolar plate.

23. A method in accordance with claim 21 further comprising:
applying a layer of a fluid composition elastomeric sealant in a single pass on a second surface of an edge portion of said membrane to form a second seal element; and
sealing the second bipolar plate and said membrane with only said second seal element, wherein said second seal element is positioned between the second bipolar plate and said second surface of the edge portion of said membrane so that gas leakage is prevented between said membrane and the second bipolar plate.

24. A method for sealing first and second bipolar plates in a proton exchange membrane fuel cell module, said method consisting of:
applying a layer of a fluid composition elastomeric sealant in a single pass on one of a first surface of an edge portion of a membrane or a surface of the first bipolar plate to form a first seal element; and
sealing the first bipolar plate and said membrane with only said first seal element, wherein said first seal element is positioned between the first bipolar plate and said first surface of the edge portion of said membrane so that gas leakage is prevented between said membrane and the first bipolar plate.

* * * * *